United States Patent [19]

Okuno et al.

[11] Patent Number: 5,336,724

[45] Date of Patent: Aug. 9, 1994

[54] PHENOLIC RESIN MOLDING COMPOUNDS AND THE ARTICLES THEREOF

[75] Inventors: Toshifumi Okuno, Ibaraki; Teruo Miyaji, Kitakatsuragi, both of Japan

[73] Assignee: Takeda Chemical Industries, Ltd., Osaka, Japan

[21] Appl. No.: 36,881

[22] Filed: Mar. 25, 1993

Related U.S. Application Data

[63] Continuation of Ser. No. 929,491, Aug. 18, 1992, abandoned, which is a continuation of Ser. No. 578,303, Sep. 5, 1990, abandoned.

[30] Foreign Application Priority Data

Sep. 8, 1989 [JP] Japan .................. 1-234114

[51] Int. Cl.$^5$ .................. C08L 61/04; C08L 61/10; C08L 33/06
[52] U.S. Cl. .................. 525/143; 525/502; 524/430; 524/433
[58] Field of Search .................. 525/143, 502; 524/430, 524/433

[56] References Cited

U.S. PATENT DOCUMENTS

| | | | |
|---|---|---|---|
| 2,902,458 | 9/1959 | Tappema | 525/143 |
| 3,438,931 | 4/1969 | Mitchell et al. | 260/38 |
| 3,617,429 | 11/1971 | LeBlanc | 525/143 |
| 3,619,346 | 11/1971 | Sandler | 525/143 |
| 3,629,364 | 12/1971 | Soldatos | 260/838 |
| 4,075,155 | 2/1978 | Phillips | 260/38 |
| 4,125,502 | 11/1978 | Nakamura et al. | 525/143 |
| 4,157,324 | 6/1979 | Culbertson | 428/436 |
| 4,476,277 | 10/1984 | Koyama et al. | 524/509 |
| 4,785,040 | 11/1988 | Gupta et al. | 524/445 |

FOREIGN PATENT DOCUMENTS 62-64858  3/1987  Japan .
2219298 12/1989  United Kingdom .

OTHER PUBLICATIONS

Mark et al., "Encyclopedia of Polymer Science and Engineering", 1988 vol. 11, pp. 87–89 and vol. 12, pp. 286–288.

*Primary Examiner*—James J. Seidleck
*Assistant Examiner*—W. Robinson H. Clark
*Attorney, Agent, or Firm*—Wenderoth, Lind & Ponack

[57] ABSTRACT

A phenolic resin molding compound comprising (1) a resol type phenolic resin, (2) a thermoplastic resin and (3) a resin forcing fiber can be compression molded into a shaped article with attractive appearance and high dimensional accuracy.

5 Claims, No Drawings

PHENOLIC RESIN MOLDING COMPOUNDS AND THE ARTICLES THEREOF

This application is a continuation of now abandoned application Ser. No. 07/929,491, filed Aug. 18, 1992, which is a continuation of now abandoned application Ser. No. 07/578,303, filed Sep. 5, 1990.

FIELD OF THE INVENTION

The present invention relates to a phenolic resin molding compound suitable for the manufacture of shaped articles having an attractive appearance and to the shaped articles thereof.

BACKGROUND OF THE INVENTION

The use of resol type phenolic resin in the field of sheet molding compound (hereinafter referred to as SMC) is reported in U.S. Pat. No. 4,075,155. Japanese Kokai Patent Publication No. 62-96556/1987 discloses a phenolic resin molding compound containing the hydroxide or oxide of an alkaline earth metal or a silane compound in addition to a resol type phenolic resin. Japanese Kokoku Patent Publication No. 61-15887/1986 describes the formula of a phenolic resin molding compound. However, while phenolic resin molding compounds have the advantage of high heat resistance and flame retardant property, they have the disadvantage that compression molding causes cure shrinkage leading to poor dimensional accuracy and to poor surface smoothness.

The object of the present invention is to provide a phenolic resin molding compound capable of giving a shaped article with an improved dimensional accuracy and surface smoothness and the shaped articles thereof.

SUMMARY OF THE INVENTION

The inventors of the present invention found that addition of a thermoplastic resin to a resol type phenolic resin yields a phenolic resin molding compound with a minimum of cure shrinkage. The present invention has been conceived and developed on the basis of the above findings.

DETAILED DESCRIPTION OF THE INVENTION

Thus, the invention relates to a phenolic resin molding compound comprising (1) a resol type phenolic resin, (2) a thermoplastic resin and (3) a reinforcing fiber and to a shaped article obtainable therefrom.

The phenolic resin to be used in the invention is what is generally called resol resin in the industry. Resol type phenolic resin is usually produced by reacting a phenol compound with a stoichiometric excess of an aldehyde compound in the presence of an alkaline catalyst.

The phenol compound used in the production of resol type phenolic resin includes, among others, monophenols (e.g. phenol, trimethylphenol, ethylphenol, m-propylphenol, butylphenol, m-sec-butylphenol, m-isobutylphenol, m-tert-butylphenol, m-bromophenol, m-chlorophenol, m-phenylphenol, m-benzylphenol, octylphenol, m-cetylphenol, m-cumylphenol, m-hydroxyacetophenol, m-hydroxybenzophenone, m-d-limonenephenol, o-cresol, m-cresol, p-cresol, 2,3-xylenol, 2,4-xylenol, 2,5-xylenol, 2,6-xylenol, 3,4-xylenol, 3,5-xylenol, etc.) and biphenols (e.g. catechol, resorcinol, hydroquinone, bisphenol A, etc.).

The aldehyde compound which can be used in the production of resol type phenolic resin includes, among others, formaldehyde and modified forms thereof, e.g. not less than 37% formalin, paraldehyde, acetaldehyde, propionaldehyde and isobutylaldehyde, and isopentylaldehyde. Formaldehyde is a preferred example. Formaldehyde may be used as an aqueous solution (not less than 37 weight %) or in the form of a low molecular weight polymer such as paraformaldehyde or trioxane. Among other examples of the aldehyde are furfural, 2-ethylhexanal, ethylbutylaldehyde, heptaldehyde, benzaldehyde and crotonaldehyde.

The resol type phenolic resin to be used in the invention is produced by reacting each mole of a phenol compound with 1 to 3 moles of an aldehyde compound in the presence of alkali dissolved in water. The preferred molar ratio of aldehyde compound to phenol compound is about 1.1/1 through 2.5/1.

The alkaline catalyst to be used in the production of resol type phenolic resin includes, among others, alkali metal or alkaline earth metal hydroxides, e.g. sodium hydroxide, calcium hydroxide, etc., ammonium hydroxide, and amines such as triethanolamine.

In accordance with the invention, a thermoplastic resin and a reinforcing fiber are added to resol type phenolic resin. The proportion of resol type phenolic resin is about 70 to 98 weight parts based on 100 weight parts of the total resin.

The thermoplastic resin to be used in the invention includes, among others, saturated polyesters (e.g. the saturated polyester obtainable by reacting a known saturated dibasic acid, e.g. terephthalic acid or isophthalic acid, with a known glycol, e.g. ethylene glycol or 1,4-butylene glycol), polyamide resins (e.g. polycaprolactam, 66-nylon, 610-nylon, nylon-11, nylon-12, etc.), homopolymers and copolymers of ethylenically unsaturated monomers (e.g. polymethyl methacrylate, polyvinyl acetate, polyethylene, polystyrene, etc. and ethylene-vinyl acetate copolymer, ethylene-methacrylic acid copolymer, styrene-vinyl acetate copolymer, styrene-methacrylic acid copolymer, etc.), rubber (e.g. ethylene-propylene rubber, styrene-butadiene copolymer, styrene-hydrogenated butadiene copolymer, etc.), and so on. Particularly preferred are polyethylene, polymethyl methacrylate, polyvinyl acetate and polystyrene. The proportion of thermoplastic resin is about 2 to 30 weight parts to each 100 weight parts of the total resin, and preferably about 5 to 20 weight parts on the same basis. Used in lesser amounts, the thermoplastic resin does not obtain a desired degree of lowprofile effect, while the use of thermoplastic resin in excess of the above range may compromise the heat resistance or flame retardancy of the product.

The reinforcing fiber to be used in the invention includes, among others, glass fibers (e.g. chopped strand mat, continuous strand mat, glass chop, glass roving, etc.), carbon fiber, inorganic fibers such as asbestos, whiskers, etc. Fibers with a monofilament diameter of about 9 to 15 $\mu$ and a length in the range of 1.5 mm to 51 mm are preferred. Particularly, the fiber length is preferably about 10 to 30 mm in SMC and about 1.5 to 15 mm in bulk molding compound (hereinafter referred to as BMC). The amount of such reinforcing fiber is about 5 to 70 weight % of the total molding compound.

A filler may be added in the molding compound of the invention. The preferred filler includes, among others, calcium carbonate, clay, talc, aluminum hydroxide, and mixtures thereof. Among other fillers that can be used are microspheres of glass, ceramic, glass powder, etc., silicate, aluminate, rock mica and so on. Instead of such filler, novolac type phenol resin may be added. When the amount of reinforcing fiber is within the range of 5 to 45 weight % of the total molding compound, the amount of the filler is about 5 to 300 weight parts and preferably about 60 to 200 weight parts. The larger the amount of reinforcing fiber, the greater is the strength of the shaped article but from the standpoint of moldability, it is preferable to reduce the amount of filler when the proportion of reinforcing fiber is increased.

As additives other than those mentioned above, catalysts, thickeners or viscosity builders, internal mold release agents, pigments, etc. can be added.

The catalyst includes, among others, the hydroxides and oxides of alkaline earth metals, and two or more kinds of them can be used in combination. The preferred alkaline earth metals are magnesium and calcium. The most desirable catalyst is calcium hydroxide. The catalyst is used in a proportion of about 1 to 15 weight % of the total molding compound.

The hydroxides and oxides of alkaline earth metals act not only as catalysts but also as thickeners. Magnesium oxide is a case in point. As other substances which double as the catalyst and thickener, silane compounds can be mentioned. Thus, for example, aminoalkylsilanes can be used. Preferred are γ-aminopropyltriethoxysilane and N-β(aminoethyl)-γ-aminopropyltrimethoxysilane.

The internal mold release agent includes, among others, stearic acid and its metal salts, such as zinc stearate, calcium stearate and magnesium stearate. Organic compounds such as glyceryl monostearate can also be used.

For the production of SMC using such a molding compound of the invention, an SMC production equipment of the type used generally for unsaturated polyester resin can be employed. Thus, a resin paste comprising said resol type phenolic resin and thermoplastic resin, if necessary supplemented with said filler, catalyst, thickener, internal mold release agent and pigment (e.g. carbon black) is applied, using a doctor blade, for instance, to the fiber reinforcement sandwiched between a pair of films (e.g. polyethylene film) and the assemblage is take up in the form of a roll to provide an SMC. This SMC is matured for an appropriate time period at a temperature between ambient temperature and about 40° C., whereby a finished SMC which can be easily handled is obtained.

For the manufacture of a BMC using the molding compound of the invention, the conventional compounding equipment (for example, a kneader, a planetary mixer, etc.) can be employed. Thus, the resol type phenolic resin and thermoplastic resin, if necessary plus the filler, catalyst, thickener, internal mold release agent and pigment, are compounded. Then, the reinforcing fiber is mixed into the compound and the resulting BMC is packaged.

The phenolic resin molding compound thus obtained is compression molded under heating to give a shaped article.

For this thermal compression molding operation, the conventional molding press or the like can be employed. The compression temperature is about 145° to 160° C. and the compression pressure is about 30 to 200 kgf/cm².

Because the molding compound of the invention contains a thermoplastic resin, it can be compression-molded into shaped articles with attractive appearance and high dimensional accuracy.

The following working examples and comparative examples are further illustrative of the invention.

In the examples, all parts and % are by weight.

EXAMPLES 1 TO 13 AND COMPARATIVE EXAMPLES 1 to 2

A 5-liter cylindrical vessel was charged with weighed amounts of resol type phenolic resin, thermoplastic resin, zinc stearate and carbon black and the charge was stirred and mixed on a high-speed mixer.

Then, calcium carbonate was added gradually to the mixture and the stirring was continued to give a uniform paste. To hold the viscosity of the paste low, the stirring was performed at a constant temperature of about 40° C. Then, immediately before impregnation of an SMC, calcium hydroxide and magnesium oxide were added to the paste and the mixture was stirred for about 1 minute. The paste was then fed to the doctor blade of an unsaturated polyester SMC impregnation machine (small-sized experimental model) and applied to a sheet of polyethylene film through the doctor blade in a predetermined amount. Then, 1-inch-long glass fiber cuttings were deposited on the coated surface of the film and a top sheet of polyethylene film was superimposed thereon to provide a sandwiched structure. Then, by means of the impregnating roll, the glass fibers were impregnated with the paste and the resulting assembly was taken up in the form of a roll and matured at 40° C. for 3 days. This procedure provided an SMC.

This SMC was compression-molded at a pressure of 100 kgf/cm² and a temperature of 150° to 155° C. and the physical properties of the product were determined. The results, as well as the SMC formula, are summarily shown in Tables 1 and 2.

The physical properties were determined in the following manner.

[Mold shrinkage]

A 30 cm square plate (3 mm thickness; keep time: 3 minutes) was molded and the mold dimensions and product dimensions at 25° C. were measured. The percent mold shrinkage was calculated by means of the following equation.

Mold shrinkage (%)=

$$\text{Mold shrinkage (\%)} = \left(1 - \frac{X1}{X0}\right)$$

X0: Average dimension of mold at 25° C. (mm)
X1: Dimension of product at 25° C. (mm)
(X0 ad X1 dimensions are measured vertically and horizontally in duplicate.

[Flexural strength and Flexural modulus]

Testpieces were cut out from the products and measured in accordance with JIS K-7203.

[Compression strength]

Testpieces were cut out from the products and tested in accordance with JIS K-7056.

TABLE 1

| | Example 1 | Example 2 | Example 3 | Example 4 | Example 5 | Example 6 | Example 7 | Example 8 | Example 9 | Example 10 | Example 11 | Comparative Example 1 |
|---|---|---|---|---|---|---|---|---|---|---|---|---|
| <Composition> (parts) | | | | | | | | | | | | |
| Resol type phenolic resin[1] | 95 | 93 | 85 | 95 | 85 | 95 | 93 | 93 | 93 | 93 | 93 | 100 |
| Polyvinyl acetate[2] | 5 | 7 | 15 | — | — | — | — | — | — | — | — | — |
| Polymethyl methacrylate[3] | — | — | — | 5 | 15 | 5 | — | — | — | — | — | — |
| Polyethylene[4] | — | — | — | — | — | — | 7 | — | — | — | — | — |
| Polystyrene[5] | — | — | — | — | — | — | — | 7 | — | — | — | — |
| Nylon-12[6] | — | — | — | — | — | — | — | — | 7 | — | — | — |
| Stylene-methyl methacrylate copolymer[7] | — | — | — | — | — | — | — | — | — | 7 | — | — |
| Saturated polyester[8] | — | — | — | — | — | — | — | — | — | — | 7 | — |
| Carbon black | 1 | 1 | 1 | — | — | — | — | — | — | — | — | 1 |
| Calcium carbonate | 100 | 100 | 100 | 100 | 100 | 50 | 100 | 100 | 100 | 100 | 100 | 100 |
| Magnesium oxide | 2 | 2 | 2 | 2 | 2 | 2 | 2 | 2 | 2 | 2 | 2 | 2 |
| Calcium hydroxide | 2 | 2 | 2 | 2 | 2 | 2 | 2 | 2 | 2 | 2 | 2 | 2 |
| Zinc stearate[9] | 4 | 4 | 4 | 4 | 4 | 4 | 4 | 4 | 4 | 4 | 4 | 4 |
| 1" Glass fiber[10] (%) | 28 | 28 | 28 | 28 | 28 | 35 | 28 | 28 | 28 | 28 | 28 | 28 |
| <Physical properties of shaped article> | | | | | | | | | | | | |
| Mold shrinkage (%) | 0.08 | 0.05 | 0.02 | 0.10 | 0.04 | 0.08 | 0.09 | 0.10 | 0.07 | 0.08 | 0.08 | 0.13 |
| Flexural strength (kgf/mm$^2$) | 23.0 | 21.0 | 19.0 | 25.6 | 21.5 | 27.0 | 22.0 | 23.5 | 21.5 | 21.0 | 20.5 | 25.0 |
| Flexural modulus (kgf/mm$^2$) | 1210 | 1200 | 1050 | 1250 | 1100 | 1300 | 1100 | 1200 | 1150 | 1200 | 1200 | 1290 |
| Compression strength (kgf/mm$^2$) | 25.5 | 22.6 | 21.5 | 25.8 | 25.0 | 28.0 | 20.3 | 22.0 | 23.5 | 21.0 | 21.5 | 27.2 |

[1] PR53674T, manufactured by Sumitomo Durez Co., Ltd.
[2] ASR-M5, manufactured by Denki Kagaku Kogyo, K.K.
[3] Dianal BR-77, manufactured by Mitsubishi Rayon Co., Ltd.
[4] Flothene UF-20, manufactured by Seitetsu Kagaku Co., Ltd.
[5] Styron 402, manufactured by Asahi Dow Co., Ltd.
[6] Manufactured by Nippon Rirusan Co., Ltd.
[7] Modiper-MS-10$^B$, manufactured by Nippon Oil and Fats Co., Ltd.
[8] 9755 Ester, manufactured by Takeda Chemical Industries, Ltd.
[9] Manufactured by Nippon Oil and Fats Co., Ltd.
[10] Manufactured by Nippon Glass Fiber Co., Ltd.

It is apparent from Table 1 that the addition of thermoplastic resin contributes to reduced mold shrinkage. The lower the mold shrinkage, the more lusterous and attractive was the surface of the shaped article.

TABLE 2

| | Example 12 | Example 13 | Comparative Example 2 |
|---|---|---|---|
| <Composition> (parts) | | | |
| Resol type phenolic resin | 95 | 95 | 100 |
| Polyvinyl acetate | 5 | 5 | — |
| Zinc stearate | 6 | 6 | 6 |
| Magnesium oxide | 3 | 3 | 3 |
| Calcium hydroxide | 3 | 3 | 3 |
| 1" Glass fiber (%) | 45 | 60 | 45 |
| <Physical properties of shaped article> | | | |
| Mold shrinkage (%) | 0.07 | 0.05 | 0.14 |
| Flexural strength (kgf/mm$^2$) | 28.5 | 31.5 | 28.0 |
| Flexural modulus (kgf/mm$^2$) | 1350 | 1380 | 1350 |
| Compression strength (kgf/mm$^2$) | 31.0 | 33.0 | 31.5 |

Though the molding compositions of Examples 12 and 13 did not contain a filler, the addition of thermoplastic resin resulted in reduced mold shrinkage and less warping of the shaped article.

EXAMPLE 14, COMPARATIVE EXAMPLE 3

Using a Sigma blade kneader, resol type phenolic resin, polymethyl methacrylate, zinc stearate, talc and clay were blended well, followed by addition of magnesium oxide and calcium hydroxide. The mixture was further kneaded for 1 minute. Then, chopped strand in an amount corresponding to 15% of BMC was added to the kneader and the whole mixture was kneaded for about 3 minutes to give a BMC. This BMC was compression-molded at a pressure of 100 kgf/cm$^2$ and a temperature of 150° to 155° C. and the physical properties of the shaped article were determined. The results as well as the BMC formulas are shown in Table Table 3.

TABLE 3

| | Example 14 | Comparative Example 3 |
|---|---|---|
| <Composition> (parts) | | |
| Resol type phenolic resin | 80 | 100 |
| Polymethyl methacrylate | 20 | — |
| Zinc stearate | 4 | 4 |
| Talc[11] | 100 | 100 |
| Clay[12] | 100 | 100 |
| Magnesium oxide | 2 | 2 |
| Calcium hydroxide | 2 | 2 |
| 1" Chopped strand[13] (%) | 15 | 15 |
| <Physical properties of the shaped article> | | |
| Mold shrinkage (%) | 0.04 | 0.08 |
| Flexural strength (kgf/mm$^2$) | 9.0 | 9.5 |
| Flexural modulus (kgf/mm$^2$) | 1250 | 1200 |
| Compression (kgf/mm$^2$) | 17.5 | 18.0 |

[11] Talc LMR, manufactured by Fuji Talc Co., Ltd.
[12] Clay ASP-400, manufactured by Engelhard Corporation, U.S.A.
[13] Manufactured by Asahi Fiber Glass Co., Ltd.

In Example 14, a shaped article with high surface gloss and low mold shrinkage was obtained.

What is claimed is:

1. An article which is produced by compression molding of a resol phenolic resin sheet molding composition comprising (1) a resin paste comprising a resol phenolic resin and polyvinyl acetate and (2) a reinforcing fiber, the proportion of the polyvinyl acetate being about 5 to 20 weight parts based on 100 parts of the total resin, and the amount of the reinforcing fiber being about 5 to 70 weight % of the total molding composition.

2. An article as claimed in claim 1, wherein the proportion of the resol phenolic resin in the phenolic resin molding composition is about 70 to 98 weight parts based on 100 weight parts of the total resin.

3. An article as claimed in claim 1, wherein the phenolic resin molding composition further contains the oxide or hydroxide of an alkaline earth metal.

4. An article as claimed in claim 3, wherein the hydroxide of an alkaline earth metal is calcium hydroxide.

5. An article as claimed in claim 3, wherein the oxide or hydroxide of an alkaline earth metal is used in the proportion of about 1 to 15 weight % of the total molding composition.

* * * * *